United States Patent Office 2,715,207
Patented Aug. 9, 1955

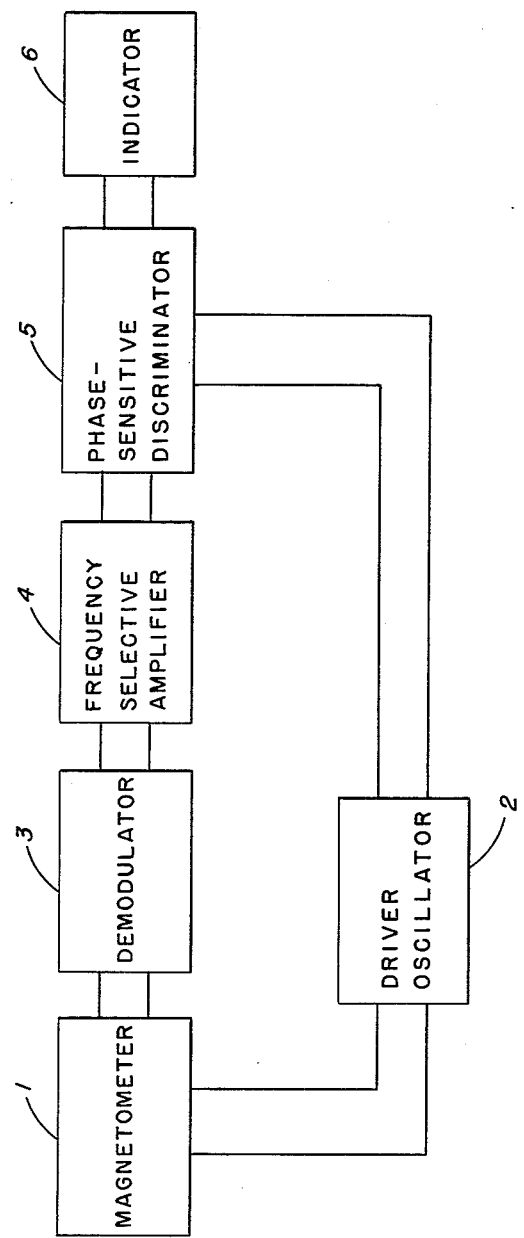

2,715,207

WAVE-TRAIN DETECTOR

Otto H. Schmitt, Port Washington, N. Y., assignor to the United States of America as represented by the Secretary of the Navy Application August 14, 1944, Serial No. 549,450

4 Claims. (Cl. 324—43)

This invention relates to an improved detector, and more particularly to a detector adapted for converting input signals in the form of wave trains into polarized output signals.

The present invention is particularly adapted for utilizing the signal output from the wave-train magnetometer which is disclosed in copending application Serial No. 543,924, filed July 7, 1944, Wave-Train Magnetometer, Walter H. Brattain, now U. S. Patent No. 2,565,799 issued August 28, 1951, and especially that from the unbalanced magnetometer there disclosed. The output signal from such a magnetometer comprises a series of wave trains the relative amplitudes of alternate trains of which is indicative of the strength of the ambient magnetic field. When the effective ambient field is zero, the magnetometer output signal contains substantially no envelope component of drive frequency. When an ambient magnetic field is present, a component having a frequency equal to the drive frequency appears. The phase of the latter component depends upon the sense of the ambient magnetic field.

In accordance with the present invention, means are provided to utilize the output from such a magnetometer in a manner which provides substantially improved performance, particularly with respect to stability, than has heretofore been readily realizable.

In the new system, the wave trains, which have already been stepped up by means of series resonance in accordance with the disclosure of the above-identified patent, are applied, either directly or through a suitable amplifier, to a demodulator for the purpose of separating out the envelope. The demodulated signal is then passed into a frequency-selective amplifier, which is tuned to be highly responsive to signals having a frequency equal to the fundamental frequency of the driver oscillator, and the output of this amplifier is in turn supplied to a phase-sensitive discriminator with which is associated an indicator.

For a better understanding of the invention, reference is made to the drawing, the single figure of which shows a wave-train detector in accordance with the present invention in block form.

Referring to the drawing, magnetometer 1 is preferably of the unbalanced, saturated-core type such as are schematically illustrated in Figs. 1 and 2 of the above-identified patent, arranged to produce wave trains in accordance with the above-identified patent as illustrated by the graph 15 in Fig. 3 of that patent. Unbalance may be provided in accordance with my Patent No. 2,560,132, filed January 1, 1944, for Unbalanced Magnetometer, issued July 10, 1951, by making one of the capacitors 10 and 11 of the aforementioned Brattain patent larger than the other. Magnetometer 1 is supplied with a suitable drive voltage from driver oscillator 2, which preferably supplies a sinusoidal output signal of, for example, 400 cycles per second. The wave-train output of magnetometer 1 is supplied to demodulator 3, which preferably is of the cathode-follower type, and desirably full wave in order to minimize the effect of variations in the characteristics of the vacuum tubes used. The output of demodulator 3 is supplied to frequency-selective amplifier 4, which includes one or more resonant circuits tuned to the fundamental frequency of driver oscillator 2, in this example preferably 400 cycles per second. Such output signal of fundamental drive frequency as may come through amplifier 4 is applied to phase-sensitive discriminator 5, a function of which is to compare the signal as to phase with the output of driver oscillator 2, and which, in combination with indicator 6, serves to provide a visual or other suitable indication of the amplitude and relative polarity of the signal supplied to phase-sensitive discriminator 5.

In operation, let it first be assumed that the effective magnetic field surrounding the elements of magnetometer 1 is zero. Under this condition, the output of the magnetometer comprises a series of wave trains having an envelope frequency twice the fundamental frequency of driver oscillator 2 and having a "carrier" frequency of the order of ten or twenty kilocycles per second. Demodulator 3 removes components of the latter frequency, leaving only a signal of envelope frequency. Since, under the stated condition, the latter frequency is twice that of driver oscillator 2, there is little or no output from amplifier 4 and hence no appreciable indication by indicator 6.

Now let it be assumed that an ambient magnetic field is present in the vicinity of the elements of magnetometer 1. Under this circumstance, the output of magnetometer 1 will comprise a series of wave trains having an envelope component having a frequency equal to the fundamental of driver oscillator 2 and a "carrier" frequency substantially the same as before. The output of demodulator 3, therefore, is a signal of fundamental driver frequency which is amplified by amplifier 4 and supplied to phase-sensitive discriminator 5. The latter unit, which may be of conventional design employing either the transformer or resistance method of reference signal injection, compares the output signal from amplifier 4 with the output of driver oscillator 2. As a result, a signal is supplied to indicator 6 which has an amplitude dependent upon the amplitude of the output signal from amplifier 4, and a polarity determined by whether the signal output from amplifier 4 is substantially in phase or substantially in phase opposition with respect to the output of driver oscillator 2. Since the phase of the output signal of amplifier 4 depends upon the sense of the ambient magnetic field, indicator 6 will provide a definite indication of both the amplitude and the sense of the ambient magnetic field.

In certain cases, it may be desirable to subject the series of wave trains comprising the output of magnetometer 1 to amplification before they are supplied to demodulator 3. It is within the scope of the present invention to so amplify the signals. Any suitable amplifier, capable of functioning at the "carrier" frequency of the wave trains, may be employed, simply by connecting it between magnetometer 1 and demodulator 3 of the drawing.

The specific forms of any of the elements 3, 4, 5 and 6 are immaterial to the present invention, and since they are well-known per se, it is unnecessary to define them in detail.

What is claimed is:

1. In a magnetometer system having a magnetometer driven by an oscillator and generating a signal composed of a carrier frequency forming wave-trains at double the oscillator frequency having alternate peak voltages producing a frequency component equal to that of said oscillator with an amplitude and phase in accordance with the strength and polarity respectively of the magnetic field being measured; a wave-train detector comprising a demodulator for separating the envelope frequency comprising the wave-trains from the carrier frequency of the signal, a frequency-selective amplifier responsive primarily to the fundamental oscillator frequency, a phase-sensitive discriminator connected to said frequency-selected amplifier for receiving said selected frequency and to said oscillator to receive said oscillator frequency for comparing the phase of the selected envelope frequency with that of the oscillator frequency, and an indicator responsive to said discriminator for indicating the amplitude and relative phase of the signal provided by the frequency-selective amplifier.

2. In a magnetometer system having a magnetometer driven by an oscillator and generating a signal composed of a carrier frequency forming wave-trains at double the oscillator frequency having alternate peak voltages producing a frequency component equal to that of said oscillator with an amplitude and phase in accordance with the strength and polarity respectively of the magnetic field being measured; a wave-train detector comprising an amplifier and demodulator for amplifying and separating the envelope frequency comprising the wave-trains from the carrier frequency of the signal, a frequency-selective amplifier responsive primarily to the fundamental oscillator frequency, a phase-sensitive discriminator connected to said frequency-selected amplifier for receiving said selected frequency and to said oscillator to receive said oscillator frequency for comparing the phase of the selected envelope frequency with that of the oscillator frequency, and an indicator responsive to said discriminator for indicating the amplitude and relative phase of the signal provided by the frequency-selective amplifier.

3. In a magnetometer system having an unbalanced magnetometer with a drive oscillator and a wave-train output, said output having a suitably high carrier frequency and forming alternate wave-trains having opposite peak voltages corresponding in amplitude and phase to the strength and polarity respectively, of the magnetic field being measured, the frequency of said trains being double that of said oscillator thus providing a component envelope frequency the same as that of said oscillator, a demodulator for receiving said output and removing said carrier frequency, a frequency-selective amplifier for receiving said envelope frequency and selecting the component equal to said oscillator frequency, a phase-sensitive discriminator for receiving said envelope frequency component, connected to said oscillator for comparing the phases of said frequencies, and a suitable indicator operated by said discriminator to show the strength and polarity of the magnetic field in accordance with the amplitude and relative phase respectively, of said envelope frequency component.

4. A carrier frequency generator, a drive oscillator for operating said generator and producing envelope frequency modulations forming wave-trains at double the frequency of said oscillator, said wave-trains having alternate peak voltages either in phase or out of phase with the modulations of said oscillator frequency, a demodulator receiving the output of said generator and removing said carrier frequency, a frequency-selective amplifier connected to said demodulator for selecting the oscillator frequency component including the alternate peak voltages, a phase-sensitive discriminator connected to said amplifier for receiving said component and to said oscillator for receiving said oscillator output and compare the phases of said component frequency relative to said oscillator output, and an indicator connected to said discriminator for indicating the amplitude of said component frequency and its phase relative to said oscillator frequency.

References Cited in the file of this patent

UNITED STATES PATENTS

| | | |
|---|---|---|
| 2,252,059 | Barth | Aug. 12, 1941 |
| 2,338,732 | Nosker | Jan. 11, 1944 |
| 2,476,273 | Beach | July 19, 1949 |
| 2,560,132 | Schmitt | July 10, 1951 |
| 2,565,799 | Brattain | Aug. 28, 1951 |